US012159239B2

(12) United States Patent
Dundigalla et al.

(10) Patent No.: US 12,159,239 B2
(45) Date of Patent: Dec. 3, 2024

(54) SYSTEM FOR AUTOMATED REGRESSION TESTING

(71) Applicant: BANK OF AMERICA CORPORATION, Charlotte, NC (US)

(72) Inventors: Srinivas Dundigalla, Waxhaw, NC (US); Pavan Chayanam, Alamo, CA (US); Steven Novack, Charlotte, NC (US); Jaimish Patel, Apex, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 997 days.

(21) Appl. No.: 17/148,134

(22) Filed: Jan. 13, 2021

(65) Prior Publication Data
US 2022/0222549 A1 Jul. 14, 2022

(51) Int. Cl.
G06N 5/04 (2023.01)
G06F 3/14 (2006.01)
G06N 20/00 (2019.01)

(52) U.S. Cl.
CPC ............. G06N 5/04 (2013.01); G06F 3/1454 (2013.01); G06N 20/00 (2019.01)

(58) Field of Classification Search
None
See application file for complete search history.

(56) References Cited

U.S. PATENT DOCUMENTS

| 8,185,917 | B2* | 5/2012 | Grechanik .......... G06F 11/3692 |
| | | | 714/38.1 |
| 8,789,172 | B2* | 7/2014 | Stolfo ..................... G06F 21/50 |
| | | | 713/188 |
| 8,978,016 | B2 | 3/2015 | Gataullin et al. |
| 9,021,445 | B2 | 4/2015 | Gataullin et al. |
| 9,298,589 | B2 | 3/2016 | Gautallin et al. |
| 9,329,980 | B2 | 5/2016 | Baril et al. |
| 9,355,016 | B2 | 5/2016 | Baril et al. |
| 9,417,859 | B2 | 8/2016 | Gounares et al. |
| 9,454,454 | B2 | 9/2016 | Abraham et al. |
| 9,594,665 | B2 | 3/2017 | Baril et al. |
| 9,772,927 | B2 | 9/2017 | Gounares et al. |
| 9,870,294 | B2 | 1/2018 | Seto |
| 9,880,915 | B2 | 1/2018 | Baril et al. |
| 9,921,937 | B2 | 3/2018 | Seto |
| 10,241,785 | B2 | 3/2019 | Krajec |
| 10,346,292 | B2 | 7/2019 | Seto et al. |

(Continued)

Primary Examiner — Alan Chen
(74) Attorney, Agent, or Firm — Moore & Van Allen PLLC; Anup Shrinivasan Iyer

(57) ABSTRACT

Systems, computer program products, and methods are described herein for automated regression testing. The present invention is configured to generate, using a regression testing engine, a second state instance map for a second version of an application; generate, using the regression testing engine, a first state instance map for a first version of the application; initiate a differential detection engine on the first state instance map and the second state instance map; determine, using the differential detection engine, one or more differential features in the second version of the application; initiate a machine learning model on the one or more differential features in the second version of the application; and classify, using the machine learning model, the one or more differential features into one or more classes.

18 Claims, 4 Drawing Sheets

(56) References Cited

U.S. PATENT DOCUMENTS

| | | |
|---|---|---|
| 10,452,458 B2 | 10/2019 | Seto |
| 2014/0115565 A1 | 4/2014 | Abraham et al. |
| 2014/0317603 A1 | 10/2014 | Gataullin et al. |
| 2015/0205691 A1 | 7/2015 | Seto |
| 2015/0254162 A1 | 9/2015 | Baril et al. |
| 2015/0254163 A1 | 9/2015 | Baril et al. |

* cited by examiner

SYSTEM FOR AUTOMATED REGRESSION TESTING

FIELD OF THE INVENTION

The present invention embraces a system for automated regression testing.

BACKGROUND

Regression testing is used to identify any issues that may have been accidentally introduced into the newer version (build) of the software application and ensure that any previous issues that have been addressed, stay addressed. For customer-facing software applications, regression testing may also focus on the end-user experience. In these cases, the regression testing, a.k.a. user interface (UI) regression testing involves identifying unintended and undesired changes to the UI of the software application as a result of code changes.

There is a need for a system for automated regression testing.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for automated regression testing is presented. The system comprising: at least one non-transitory storage device; and at least one processing device coupled to the at least one non-transitory storage device, wherein the at least one processing device is configured to: generate, using a regression testing engine, a second state instance map for a second version of an application; generate, using the regression testing engine, a first state instance map for a first version of the application; initiate a differential detection engine on the first state instance map and the second state instance map; determine, using the differential detection engine, one or more differential features in the second version of the application; initiate a machine learning model on the one or more differential features in the second version of the application; and classify, using the machine learning model, the one or more differential features into one or more classes.

In some embodiments, the at least one processing device is further configured to: generate, using the regression testing engine, the second state instance map for the second version of the application, wherein generating further comprises: determining one or more states of the second version of the application; capturing, using the regression testing engine, one or more screenshots of one or more user interfaces of the second version of the application; and generating, using the regression testing engine, the second state instance map, wherein generating further comprises mapping the one or more states of the second version of the application with the one or more screenshots of the one or more user interfaces of the second version of the application.

In some embodiments, the at least one processing device is further configured to: initiate a user interface navigation engine on the second version of the application, wherein the user interface navigation engine is configured to execute one or more actions on the one or more user interfaces of the second version of the application to navigate through the one or more user interfaces of the second version of the application, wherein the one or more actions comprises one or more simulated interactions with one or more features associated with each of the one or more user interfaces of the second version of the application.

In some embodiments, the at least one processing device is further configured to: capture a first screenshot of a first user interface, wherein the first user interface is associated with the one or more user interfaces of the second version of the application, wherein the first screenshot is associated with the one or more screenshots of the one or more user interfaces of the second version of the application; map the first screenshot to a first state, wherein the first state is associated with the one or more states of the second version of the application; execute a first action on the first user interface, wherein the first action is associated with the one or more actions; determine that the execution of the first action on the first user interface causes the second version of the application to navigate to a second user interface, wherein the second user interface is associated with the one or more user interfaces of the second version of the application; capture a second screenshot of the second user interface, wherein the second screenshot is associated with the one or more screenshots of the one or more user interfaces of the second version of the application; and map the second screenshot to a second state, wherein the second state associated with the one or more states of the second version of the application.

In some embodiments, the at least one processing device is further configured to: generate, using the regression testing engine, the first state instance map for the first version of the application, wherein generating further comprises: determining one or more states of the first version of the application; capturing, using the regression testing engine, one or more screenshots of one or more user interfaces of the first version of the application; and generating, using the regression testing engine, the first state instance map, wherein generating further comprises mapping the one or more states of the first version of the application with the one or more screenshots of the one or more user interfaces of the first version of the application.

In some embodiments, the at least one processing device is further configured to: determine, using the differential detection engine, the one or more differential features in the second version of the application, wherein determining further comprises comparing the second state instance map with the first state instance map.

In some embodiments, the at least one processing device is further configured to: compare the second state instance map with the first state instance map, wherein comparing further comprises comparing the one or more screenshots of the one or more user interfaces of the second version of the application with the one or more screenshots of the one or more user interfaces of the first version of the application at each of the one or more states.

In some embodiments, the at least one processing device is further configured to: determine, using the differential detection engine, one or more past differential features in one or more previous versions of the application; electronically receive, from a computing device of a user, the one or more classes; initiate a machine learning algorithm on the one or more past differential features and the one or more classes; and train, using the machine learning algorithm, the machine learning model to classify one or more unseen differential features into the one or more classes.

In another aspect, a computer program product for automated regression testing is presented. The computer program product comprising a non-transitory computer-readable medium comprising code causing a first apparatus to: generate, using a regression testing engine, a second state instance map for a second version of an application; generate, using the regression testing engine, a first state instance map for a first version of the application; initiate a differential detection engine on the first state instance map and the second state instance map; determine, using the differential detection engine, one or more differential features in the second version of the application; initiate a machine learning model on the one or more differential features in the second version of the application; and classify, using the machine learning model, the one or more differential features into one or more classes.

In yet another aspect, a method for automated regression testing is presented. The method comprising: generating, using a regression testing engine, a second state instance map for a second version of an application; generating, using the regression testing engine, a first state instance map for a first version of the application; initiating a differential detection engine on the first state instance map and the second state instance map; determining, using the differential detection engine, one or more differential features in the second version of the application; initiating a machine learning model on the one or more differential features in the second version of the application; and classifying, using the machine learning model, the one or more differential features into one or more classes.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
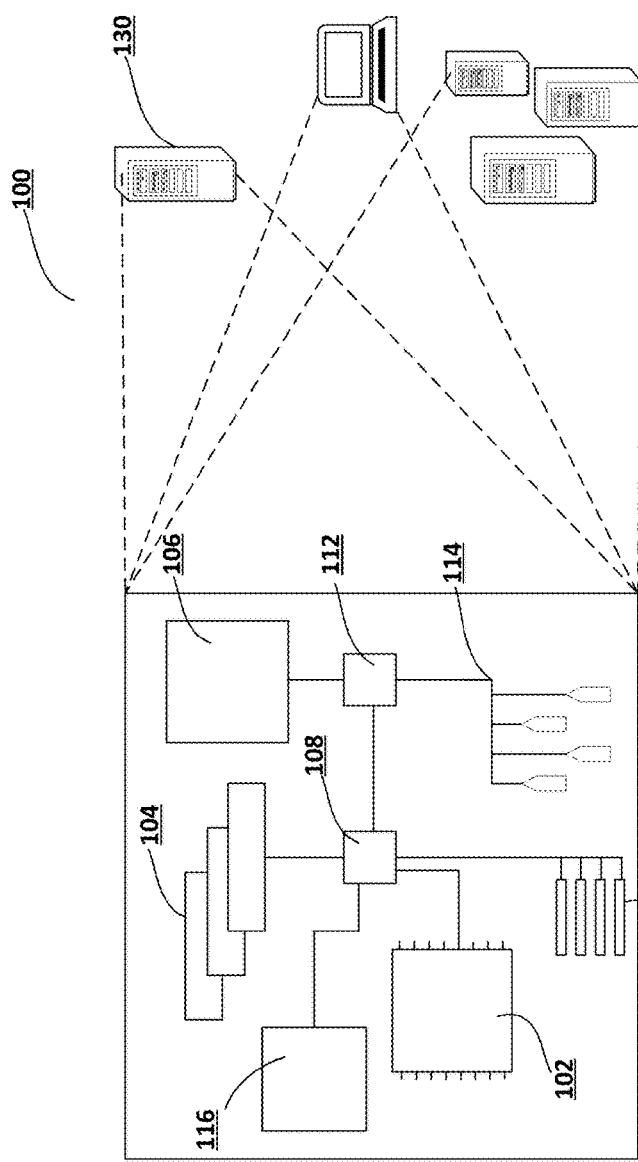
Figure 1:
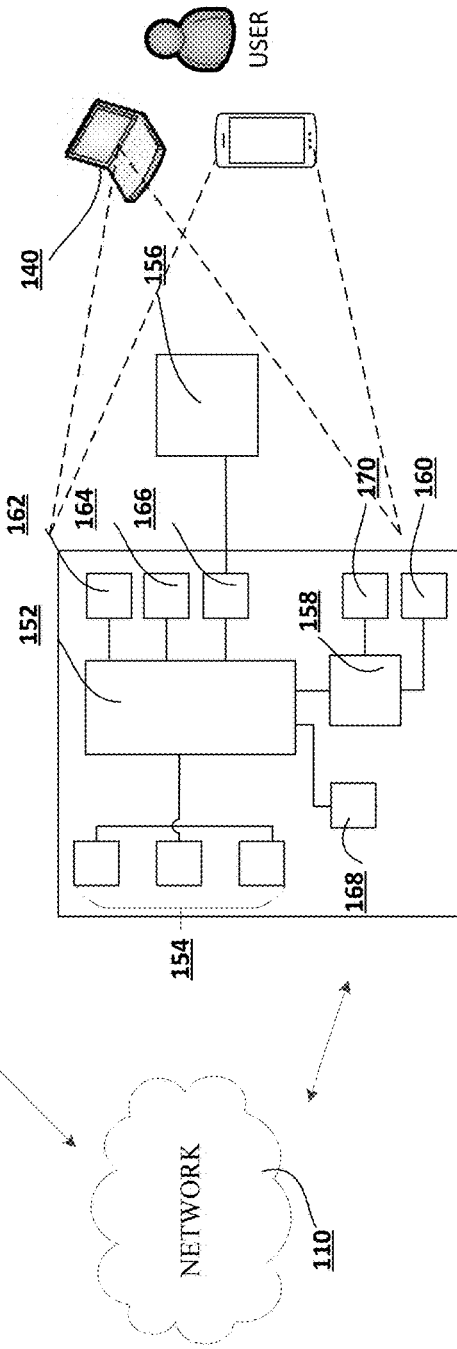
Figure 2:
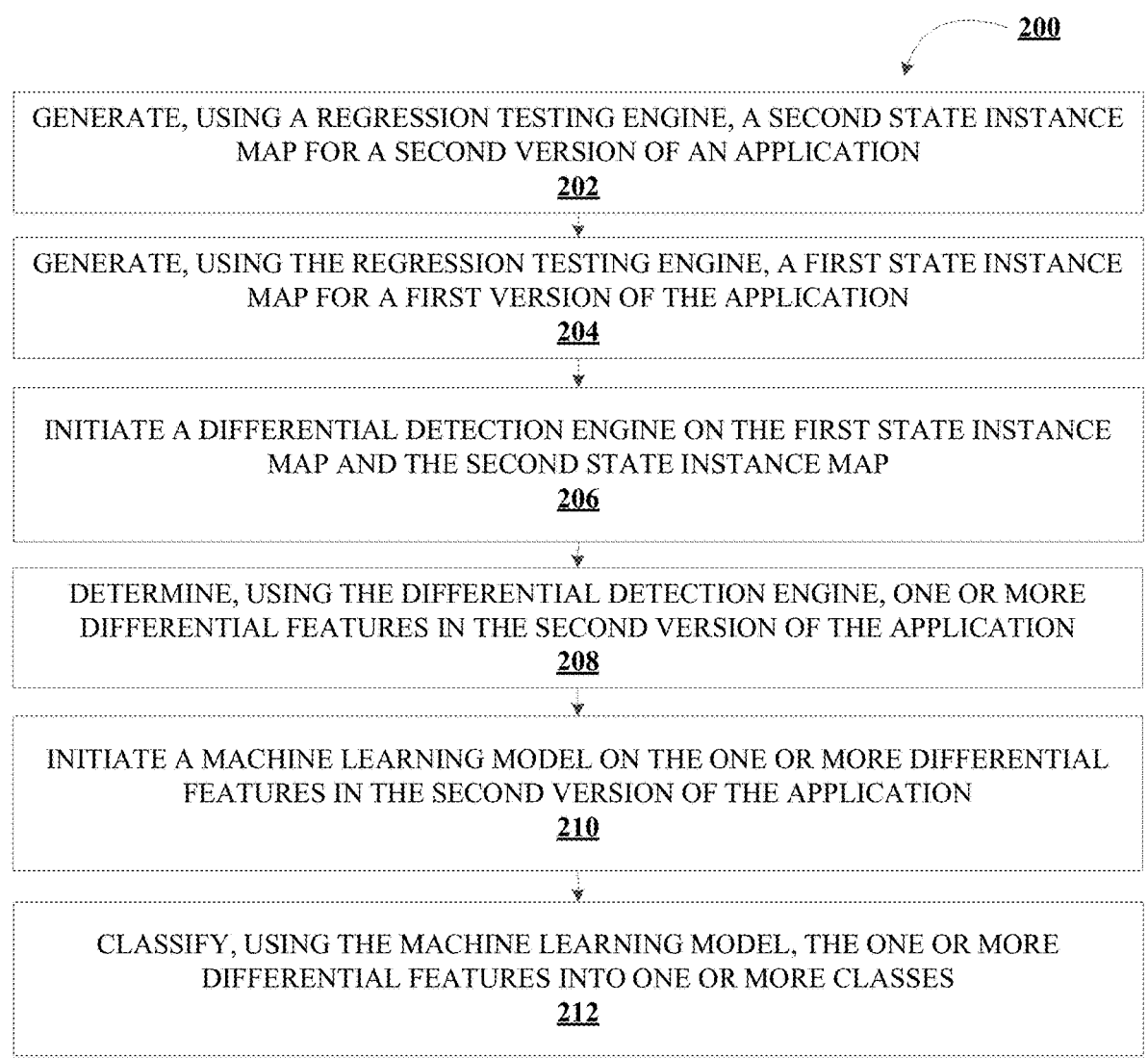
Figure 3:
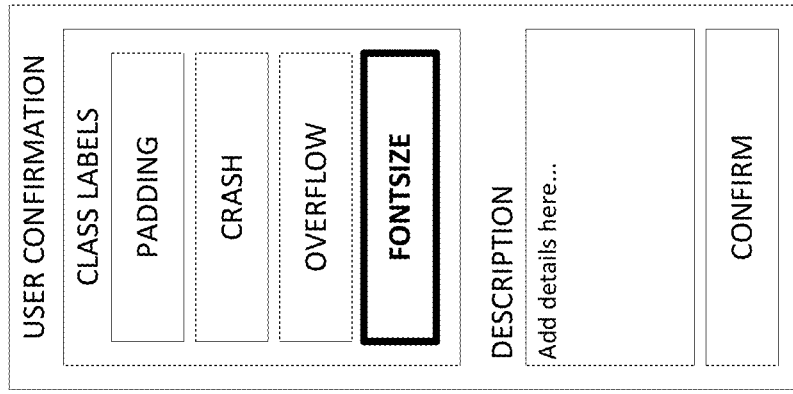
Figure 3:
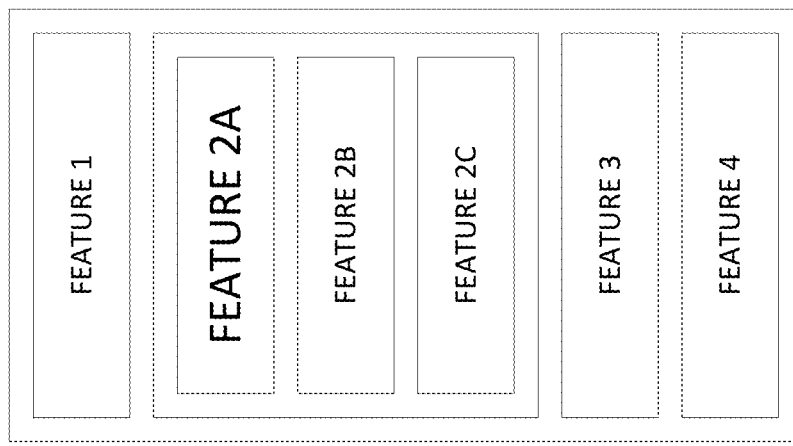
Figure 3:
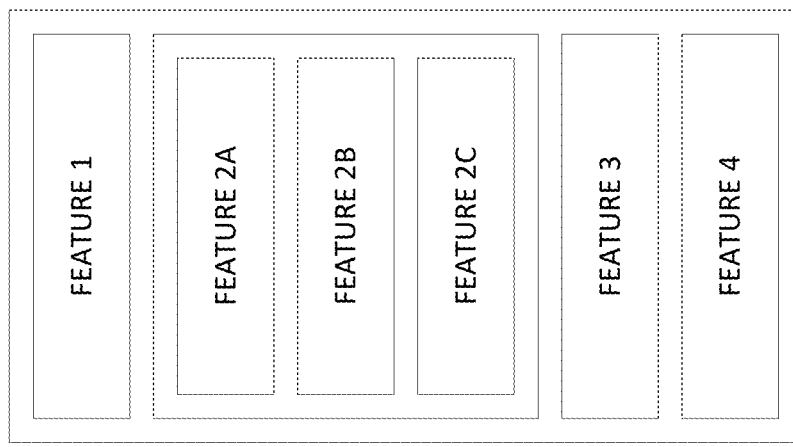
Figure 4:
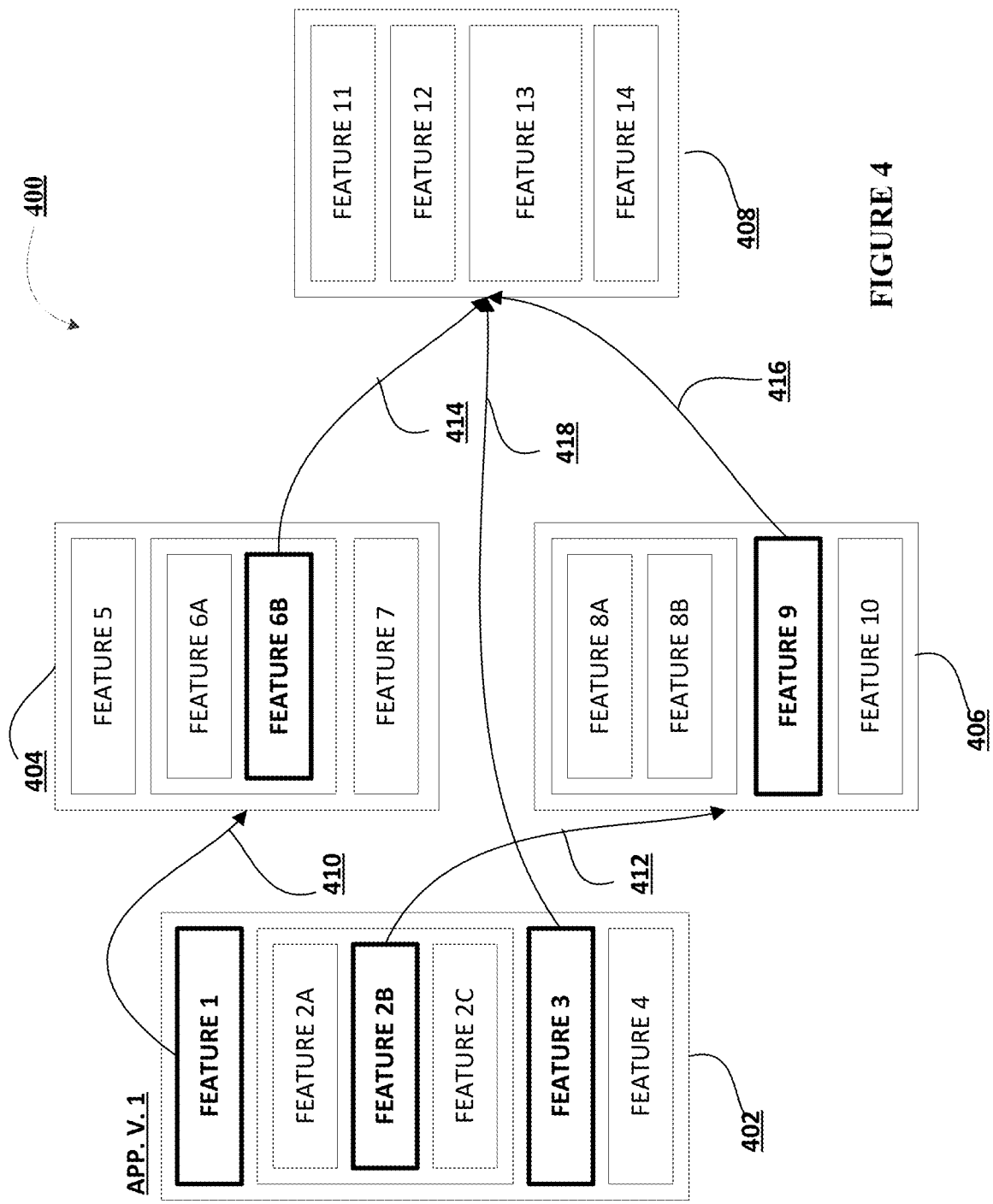

Having thus described embodiments of the invention in general terms, reference will now be made the accompanying drawings, wherein:

FIG. 1 illustrates technical components of a system for automated regression testing, in accordance with an embodiment of the invention;

FIG. 2 illustrates a process flow for automated regression testing, in accordance with an embodiment of the invention;

FIG. 3 illustrates the classification of the differential features into one or more classes, in accordance with an embodiment of the invention;

FIG. 4 illustrates a process flow for generating a state instance map, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

As software applications are updated or changed, or reused on a modified target, emergence of new issues and/or re-emergence of old issues is expected. Regressing testing is the process of re-running functional and non-functional tests on a software application to ensure that the change and/or addition implemented has not affected any existing functionality. Thus, the purpose of regression testing is to identify any issues that may have been accidentally introduced into the newer version (build) of the software application and ensure that any previous issues that have been addressed, stay addressed. For customer-facing software applications, regression testing may also focus on the end-user experience. In these cases, the regression testing, a.k.a. user interface (UI) regression testing involves identifying unintended and undesired changes to the UI of the software application as a result of code changes. When conducting UI regression testing, it is not uncommon for entities to take a manual approach. Even the most efficient manually implemented UI regression techniques are tedious and cost-prohibitive. There is a need for a system to implement automated detection and reconciliation of UI regressions across various versions of the software application build.

The present invention provides the functional benefit of generating a state instance map for each version of the software application where each user interface is mapped to a particular state. Once the state instance maps are generated, the present invention then implements image classification techniques to compare the state instance maps for consecutive versions of the software application to identify differential features. Once the differential features are identified, the present invention implements a machine learning model to classify the differential features based on whether they are intentional feature differentials or unintentional feature differentials.

To compare the different versions of the application, the system of the present invention generates a state space representation of the application. To this end, the system generates a state instance map for both a current version of the application after code changes and a previous version of the application before code changes. The state instance map captures the interactive behavior of the application and is represented by a pairwise model of nodes and edges. To generate each node, the system navigates through the various user interfaces of the application. At each user interface, the system records the state of the application and captures a screenshot of the user interface. Each state is then mapped to a corresponding screenshot of the user interface to generate a node. To generate each edge, the system records the action-based navigation that happens when an action is executed on a user interface. In other words, the edges capture a relationship between a current state of the application and a preceding state of the application. Next, the system compares the state instance map for the current version of the application and state instance map for the previous version of the application to identify differential features. To achieve this, the system implements an image classification algorithm such as convolutional neural networks (CNN) to identify differential features.

Once the differential features are identified, the system of the present invention implements a machine learning model to classify the differential features based on whether they are intentional feature differentials or unintentional feature differentials. These differential features may then be classified using machine learning models generated using supervised machine learning algorithms into different class labels. The machine learning model is trained using past differential features that have been detected. For each past differential feature, the system receives class labels from the user. This input is then used to further train the machine learning model. By continuously training the machine learning model, the system creates a self-improving ecosystem for UI regression testing that is capable of eliminating the need for manually verifying every image for differential features until the differential features that are detected by the machine learning model are the only ones that are deemed worth looking at.

FIG. 1 presents an exemplary block diagram of the system environment for automated regression testing 100, in accordance with an embodiment of the invention. FIG. 1 provides a unique system that includes specialized servers and system communicably linked across a distributive network of nodes required to implement the automated regression testing process described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 140 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for automated regression testing 200, in accordance with an embodiment of the invention. As shown in block 202, the process flow includes generating, using a regression testing engine, a second state instance map for a second version of an application. In some embodiments, a state instance map of an application may be a sequence and collaboration diagram that captures the interactive behavior of the application. In one aspect, the state instance map focuses on the flow of control as a result of user interaction with the various user interfaces of the application. In some embodiments, the state instance map may be a pairwise model represented by a plurality of nodes and edges, where each node is a visual representation of the object and each edge is a visual representation of a relation.

In some embodiments, to generate the second state instance map for the second version of the application, the system may be configured to determine one or more states of the second version of the application. In some embodiments, the state of an application may refer to a configuration or condition of the application at a specific time as a result of any action executed by the user. Typically, users execute actions on an application via the user interfaces. Each user interface includes a number of features accessible to the user. Therefore, to determine the states of the application, the system may be configured to initiate a user interface navigation engine on the application to execute actions on the user interfaces of the application to navigate through the various user interfaces. In one aspect, these actions may be simulated interactions with features available on each user interface of the application. As the user interface navigation engine traverses through the application, the system may be configured to record a state of the application each time the navigation engine lands on a different user interface.

In some embodiments, the system may be configured to capture, using the regression testing engine, one or more screenshots of one or more user interfaces of the second version of the application. At each recorded state, the system may be configured to capture a screenshot of the user interface of the application. In response to capturing the one or more screenshots, the system may be configured to map the states of the second version of the application with the screenshots of the user interfaces of the application. In this way, each recorded state is mapped to a screenshot of the corresponding user interface.

In response to recording the states of the application, capturing a screenshots of a user interfaces of the application in the recorded states, and mapping the recorded states to the corresponding screenshots of the user interfaces, the system may be configured to generate the state instance map. In one aspect, each recorded state and the screenshot of the user interface to which it is mapped may be represented as a node in the pairwise model of the state instance map. Each action-based navigation to a recorded state is captured as an edge in the pairwise model of the state instance map. Therefore, to generate a complete state instance map the system may be configured to recursively record the state of the application for each action that can be performed on a particular user interface and the map the particular state to the screenshot of the user interface that was previously not captured. In an example embodiment, the system may be configured to capture a first screenshot of a first user interface. In some embodiments, the first user interface may be the landing screen of the application when the application is launched. In some embodiments, when the application is launched, the system may be configured to record the state of the application as its first state. In response to capturing the first screenshot and recording the state of the application, the system may be configured to map the first screenshot to the first state. Thus, the first screenshot and the first state are mapped and recorded as a first node in the state instance map.

Having mapped the first screenshot of the first user interface to the first state, the system may then execute a first action on the first user interface. As described herein, the system may be configured to initiate the user interface navigation engine to execute the first action on a first feature of the first user interface. In response to executing the first action, the system may be configured to determine that the execution of the first action on the first user interface causes the second version of the application to navigate to a second user interface. In some embodiments, the system may be configured to record a new state (e.g., second state) of the application when the application navigates to the second user interface. In response, the system may be configured to capture a second screenshot of the second user interface. In response to capturing the second screenshot and recording the new state of the application, the system may be configured to map the second screenshot to the second state. Thus, the second screenshot and the second state are mapped and recorded as a second node in the state instance map. In addition, the action-based navigation, i.e., the navigation from the first user interface to the second user interface as a result of the execution of the first action is captured as the edge between the first node and the second node.

Next, the system may be configured to execute a second action on the first user interface. In some embodiments, the system may be configured to execute the second action on a second feature of the first user interface. In response to executing the second action, the system may be configured to determine that the execution of the second action on the first user interface causes the second version of the application to navigate to a third user interface. Same as above, the system may be configured to capture a third screenshot of the third user interface and record a new state of the application as a third state. In response to capturing the third screenshot and recording the new state of the application, the system may be configured to map the third screenshot to the third state. Thus, the third screenshot and the third state are mapped and recorded as a third node in the state instance map. In addition, the action-based navigation, i.e., the navigation from the first user interface to the third user interface as a result of the execution of the third action is captured as the edge between the first node and the third node.

In this way, the system may be configured to execute an action on each feature of each user interface recursively, record the resulting state of the application, and map the screenshot of the user interface with the corresponding state of the application. Each state-screenshot mapping is then recorded as a node and the corresponding action-based navigation between the states are captured as edges.

In some embodiments, each node may be paired with one or more edges. This may happen when the execution of an action on a feature of a user interface may result in the application navigating to a user interface whose state has been previously recorded, i.e., there exists a node in the state instance map that depicts the mapping between the screenshot of the user interface and the state of the application. In such cases, the system may be configured to merely record the action-based navigation as an additional edge to the existing node.

Next, as shown in block 204, the process flow includes generating, using the regression testing engine, a first state instance map for a first version of the application. Similar to the second state instance map, the first state instance map may be a pairwise model represented by a plurality of nodes and edges, where each node is a visual representation of the object and each edge is a visual representation of a relation. The nodes of the first state instance map for the first version of the application may be the state-screenshot maps and the edges may be the corresponding action-based navigation between the states. In some embodiments, to generate the first state instance map, the system may be configured to implement a technical process that is the same or similar to the process used to generate the second state instance map.

Next, as shown in block 206, the process flow includes initiating a differential detection engine on the first state instance map and the second state instance map. In some embodiments, the differential detection engine may include one or more machine learning algorithms capable of implementing image classification techniques. By implementing the differential detection engine on the first state instance map and the second state instance map, the system may be configured to generate a similarity function for comparing the screenshots of the user interfaces of the first version of the application and the screenshots of the user interfaces of the second version of the application. In example embodiments, the similarity function may be encoded using a convolutional neural network (CNN) based model and can implement any of one or more neural network architectures including, but not limited to 2-channel, Siamese, Pseudo-Siamese, deep network, central-surround two-stream network, spatial pyramid pooling (SPP), or any other applicable neural network architecture capable of comparing two images.

Next, as shown in block 208, the process flow includes determining, using the differential detection engine, one or more differential features in the second version of the application. In some embodiments, to determine the differential features, the system may be configured to compare the second state instance map with the first state instance map. In this regard, the system may be configured to compare the one or more screenshots of the one or more user interfaces associated with the second version of the application with the one or more screenshots of the one or more user interfaces associated with the first version of the application at each of the one or more states. In one aspect, the differential features may include any difference between the image (screenshot) of a user interface of the first version of the application and the corresponding image (screenshot) of a user interface of the second version of the application.

In some embodiments, the system may be configured to align the states of the first state instance map and the second state instance map, and then compare the screenshots of the first state instance map and the second state instance map in each state. By aligning the states before comparing the corresponding screenshots, the system may be configured to ensure that each user interface in the first version of the application is compared to the corresponding user interface in the second version of the application. For example, by aligning the states, the first user interface of the first version of the application is compared with the first user interface of the second version of the application.

Next, as shown in block 210, the process flow includes initiating a machine learning model on the one or more differential features in the second version of the application. As described herein, the machine learning model may refer to a mathematical model generated by machine learning algorithms based on training data, to make predictions or decisions without being explicitly programmed to do so. In some embodiments, the system may be configured to generate the machine learning model by implementing one or more machine learning algorithms capable of receiving an analyzing input data to predict output values within an acceptable range.

Accordingly, to generate the machine learning model capable of determining whether the differential features are a result of regression or a deliberate feature, the system may be configured to determine, using the differential detection engine, one or more past differential features in one or more previous versions of the application. For each past differential feature, the system may be configured to electronically receive, from a computing device of a user, one or more classes (or class labels). In some embodiments, the one or more classes are used to define the types of possible differential features. In response to receiving the classes, the system may be configured to initiate a machine learning algorithm on the one or more past differential features and the one or more classes to generate a training dataset. In response to generating the training dataset, the system may be configured to train, using the machine learning algorithm, the machine learning model to classify one or more unseen differential features into the one or more classes. In some embodiments, the one or more unseen differential features may include differential features identified based on comparing the first state instance map and the second state instance map.

Next, as shown in block 212, the process flow includes classifying, using the machine learning model, the one or more differential features into one or more classes. By classifying the differential features into one or more classes, the system may be configured to create a self-improving ecosystem for UI regression testing that is capable of eliminating the need for manually verifying every image for differential features until the differential features that are detected by the machine learning model are the only ones that are deemed worth looking at.

In some embodiments, in response to classifying the differential features, the system may be configured to transmit a notification to the computing device of the user indicating the various classes each differential feature is classified into. In this regard, the notification may include a most likely class the differential feature may be associated with. In response, the system may be configured to electronically receive, from the computing device of the user, a user input confirming the most likely class associated with the differential feature. In some embodiments, the user input may not confirm the most likely class associated with the differential feature but provide include a selection of a class that was not considered the most likely by the machine learning model for the differential feature. In some embodiments, the user input may provide a class that was not included in the various classes provided by the machine learning model. In response to receiving the user input verifying the classification, the system may be configured to re-train the machine learning model with updated inputs.

FIG. 3 illustrates the classification of the differential features into one or more classes 300, in accordance with an embodiment of the invention. FIG. 3 illustrates an exemplary screenshot of the user interface 302 from the first version of the application, APP.V.1, the corresponding exemplary screenshot of the user interface 304 from the second version of the application, APP.V.2, and a notification 306 generated for the user to confirm the classification of the differential features detected by comparing the user interface 302 and the user interface 304. In this exemplary embodiment, the differential detection engine may determine a dissimilarity between "FEATURE 2A" in the screenshot of the user interface 302 and the screenshot of the user interface 304 and indicate the dissimilarity as a differential feature. In response, the machine learning model may classify the differential feature into one or more classes. Once the machine learning model classifies the differential feature, the system may be configured to generate the notification 306 to be displayed on the computing device of the user. The user may then be able to confirm and verify the class of the differential feature and optionally providing comments on the confirmation.

FIG. 4 illustrates an exemplary state instance map generated for an application 400, in accordance with an embodiment of the invention. FIG. 4 illustrates an exemplary state instance map for APP.V.1. The state instance map includes nodes 402, 404, 406, and 408, with each node representing a state-screenshot mapping. Also included in the state instance map are edges 410, 412, 414, 416, and 418, where each edge captures a relationship between a current node and a preceding node. Node 402 represents a screenshot of a first user interface of APP.V.1 and has features, FEATURE 1, FEATURES 2A-2C, FEATURE 3, and FEATURE 4. When the user interface navigation engine simulates an execution of an action on FEATURE 1, the application navigates to a second user interface from the first user interface and changes its state. This information is captured and recorded in the form of a state-screenshot mapping resulting in node 404. The corresponding action-based navigation that caused the transition is captured as edge 410. Similarly, when the user interface navigation engine simulates an execution of an action on FEATURE 2B, the application navigates to a third user interface from the first user interface and changes its state. This information is captured and recorded in the form of a state-screenshot mapping resulting in node 406. The corresponding action-based navigation that caused the transition is captured as edge 412. Similarly, when the user interface navigation engine simulates an execution of an action on FEATURE 3, the application navigates to a fourth user interface from the first user interface and changes its state. This information is captured and recorded in the form of a state-screenshot mapping resulting in node 408. The corresponding action-based navigation that caused the transition is captured as edge 418.

Node 404 represents a screenshot of the second interface of APP.V.1 and has features, FEATURE 5, FEATURES 6A-6B, and FEATURE 7. When the user interface navigation engine simulates an execution of an action on FEATURE 6B, the application navigates to the fourth user interface from the second user interface and changes its state. Since the state-screenshot mapping of node 408 already exists, only the corresponding action-based navigation that caused the transition is captured as edge 414.

Node 406 represents a screenshot of the third interface of APP.V.1 and has features, FEATURE 8A-8B, FEATURE 9, and FEATURE 10. When the user interface navigation engine simulates an execution of an action on FEATURE 9, the application navigates to the fourth user interface from the third user interface and changes its state. Since the state-screenshot mapping of node 408 already exists, only the corresponding action-based navigation that caused the transition is captured as edge 416.

Node 408 represents a screenshot of the second interface of APP.V.1 and has features, FEATURE 11, FEATURES 12, FEATURE 13, and FEATURE 14. The process of navigating and traversing through the user interfaces are carried out as described herein until each user interface is captured and recorded as a node and its corresponding action-based navigation that caused the transition is captured as an edge.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for automated regression testing, the system comprising:
   a processor;
   a non-transitory storage device containing instructions that, when executed by the processor, cause the processor to:
   generate, using a regression testing engine, a second state instance map for a second version of an application, wherein generating further comprises:
   determining one or more states of the second version of the application;
   capturing, using the regression testing engine, one or more screenshots of one or more user interfaces of the second version of the application, wherein capturing further comprises executing one or more actions on the one or more user interfaces of the second version of the application to navigate through the one or more user interfaces of the second version of the application, wherein the one or more actions comprises one or more simulated interactions with one or more features associated with each of the one or more user interfaces of the second version of the application; and
   mapping the one or more states of the second version of the application with the one or more screenshots of the one or more user interfaces of the second version of the application;
   generate, using the regression testing engine, a first state instance map for a first version of the application;
   initiate a differential detection engine on the first state instance map and the second state instance map;
   determine, using the differential detection engine, one or more differential features in the second version of the application;
   initiate a machine learning model on the one or more differential features in the second version of the application; and
   classify, using the machine learning model, the one or more differential features into one or more classes.

2. The system of claim 1, wherein the instructions, when executed, cause the processor to:
   capture a first screenshot of a first user interface, wherein the first user interface is associated with the one or more user interfaces of the second version of the application, wherein the first screenshot is associated with the one or more screenshots of the one or more user interfaces of the second version of the application;
   map the first screenshot to a first state, wherein the first state is associated with the one or more states of the second version of the application;
   execute a first action on the first user interface, wherein the first action is associated with the one or more actions;
   determine that the execution of the first action on the first user interface causes the second version of the application to navigate to a second user interface, wherein the second user interface is associated with the one or more user interfaces of the second version of the application;
   capture a second screenshot of the second user interface, wherein the second screenshot is associated with the one or more screenshots of the one or more user interfaces of the second version of the application; and
   map the second screenshot to a second state, wherein the second state associated with the one or more states of the second version of the application.

3. The system of claim 2, wherein the instructions, when executed, cause the processor to:
   generate, using the regression testing engine, the first state instance map for the first version of the application, wherein generating further comprises:
   determining one or more states of the first version of the application;

capturing, using the regression testing engine, one or more screenshots of one or more user interfaces of the first version of the application; and generating, using the regression testing engine, the first state instance map, wherein generating further comprises mapping the one or more states of the first version of the application with the one or more screenshots of the one or more user interfaces of the first version of the application.

4. The system of claim 3, wherein the instructions, when executed, cause the processor to:

determine, using the differential detection engine, the one or more differential features in the second version of the application, wherein determining further comprises comparing the second state instance map with the first state instance map.

5. The system of claim 4, wherein the instructions, when executed, cause the processor to:

compare the second state instance map with the first state instance map, wherein comparing further comprises comparing the one or more screenshots of the one or more user interfaces of the second version of the application with the one or more screenshots of the one or more user interfaces of the first version of the application at each of the one or more states.

6. The system of claim 1, wherein the instructions, when executed, cause the processor to:

determine, using the differential detection engine, one or more past differential features in one or more previous versions of the application;

electronically receive, from a computing device of a user, the one or more classes;

initiate a machine learning algorithm on the one or more past differential features and the one or more classes; and train, using the machine learning algorithm, the machine learning model to classify one or more unseen differential features into the one or more classes.

7. A computer program product for automated regression testing, the computer program product comprising a non-transitory computer-readable medium comprising code causing a first apparatus to:

generate, using a regression testing engine, a second state instance map for a second version of an application, wherein generating further comprises:

determining one or more states of the second version of the application;

capturing, using the regression testing engine, one or more screenshots of one or more user interfaces of the second version of the application, wherein capturing further comprises executing one or more actions on the one or more user interfaces of the second version of the application to navigate through the one or more user interfaces of the second version of the application, wherein the one or more actions comprises one or more simulated interactions with one or more features associated with each of the one or more user interfaces of the second version of the application; and mapping the one or more states of the second version of the application with the one or more screenshots of the one or more user interfaces of the second version of the application;

generate, using the regression testing engine, a first state instance map for a first version of the application;

initiate a differential detection engine on the first state instance map and the second state instance map;

determine, using the differential detection engine, one or more differential features in the second version of the application;

initiate a machine learning model on the one or more differential features in the second version of the application; and classify, using the machine learning model, the one or more differential features into one or more classes.

8. The computer program product of claim 7, wherein code further causes the first apparatus to:

capture a first screenshot of a first user interface, wherein the first user interface is associated with the one or more user interfaces of the second version of the application, wherein the first screenshot is associated with the one or more screenshots of the one or more user interfaces of the second version of the application;

map the first screenshot to a first state, wherein the first state is associated with the one or more states of the second version of the application;

execute a first action on the first user interface, wherein the first action is associated with the one or more actions;

determine that the execution of the first action on the first user interface causes the second version of the application to navigate to a second user interface, wherein the second user interface is associated with the one or more user interfaces of the second version of the application;

capture a second screenshot of the second user interface, wherein the second screenshot is associated with the one or more screenshots of the one or more user interfaces of the second version of the application; and map the second screenshot to a second state, wherein the second state associated with the one or more states of the second version of the application.

9. The computer program product of claim 8, wherein code further causes the first apparatus to:

generate, using the regression testing engine, the first state instance map for the first version of the application, wherein generating further comprises:

determining one or more states of the first version of the application;

capturing, using the regression testing engine, one or more screenshots of one or more user interfaces of the first version of the application; and generating, using the regression testing engine, the first state instance map, wherein generating further comprises mapping the one or more states of the first version of the application with the one or more screenshots of the one or more user interfaces of the first version of the application.

10. The computer program product of claim 9, wherein code further causes the first apparatus to:

determine, using the differential detection engine, the one or more differential features in the second version of the application, wherein determining further comprises comparing the second state instance map with the first state instance map.

11. The computer program product of claim 10, wherein code further causes the first apparatus to:

compare the second state instance map with the first state instance map, wherein comparing further comprises comparing the one or more screenshots of the one or more user interfaces of the second version of the application with the one or more screenshots of the one or more user interfaces of the first version of the application at each of the one or more states.

12. The computer program product of claim 7, wherein code further causes the first apparatus to:
- determine, using the differential detection engine, one or more past differential features in one or more previous versions of the application;
- electronically receive, from a computing device of a user, the one or more classes;
- initiate a machine learning algorithm on the one or more past differential features and the one or more classes; and
- train, using the machine learning algorithm, the machine learning model to classify one or more unseen differential features into the one or more classes.

13. A method for automated regression testing, the method comprising:
- generating, using a regression testing engine, a second state instance map for a second version of an application, wherein generating further comprises:
  - determining one or more states of the second version of the application;
  - capturing, using the regression testing engine, one or more screenshots of one or more user interfaces of the second version of the application, wherein capturing further comprises executing one or more actions on the one or more user interfaces of the second version of the application to navigate through the one or more user interfaces of the second version of the application, wherein the one or more actions comprises one or more simulated interactions with one or more features associated with each of the one or more user interfaces of the second version of the application; and
  - mapping the one or more states of the second version of the application with the one or more screenshots of the one or more user interfaces of the second version of the application;
- generating, using the regression testing engine, a first state instance map for a first version of the application;
- initiating a differential detection engine on the first state instance map and the second state instance map;
- determining, using the differential detection engine, one or more differential features in the second version of the application;
- initiating a machine learning model on the one or more differential features in the second version of the application; and
- classifying, using the machine learning model, the one or more differential features into one or more classes.

14. The method of claim 13, wherein the method further comprises:
- capturing a first screenshot of a first user interface, wherein the first user interface is associated with the one or more user interfaces of the second version of the application, wherein the first screenshot is associated with the one or more screenshots of the one or more user interfaces of the second version of the application;
- mapping the first screenshot to a first state, wherein the first state is associated with the one or more states of the second version of the application;
- executing a first action on the first user interface, wherein the first action is associated with the one or more actions;
- determining that the execution of the first action on the first user interface causes the second version of the application to navigate to a second user interface, wherein the second user interface is associated with the one or more user interfaces of the second version of the application;
- capturing a second screenshot of the second user interface, wherein the second screenshot is associated with the one or more screenshots of the one or more user interfaces of the second version of the application; and
- mapping the second screenshot to a second state, wherein the second state associated with the one or more states of the second version of the application.

15. The method of claim 14, wherein generating the first state instance map for the first version of the application further comprises:
- determining one or more states of the first version of the application;
- capturing, using the regression testing engine, one or more screenshots of one or more user interfaces of the first version of the application; and
- generating, using the regression testing engine, the first state instance map, wherein generating further comprises mapping the one or more states of the first version of the application with the one or more screenshots of the one or more user interfaces of the first version of the application.

16. The method of claim 15, wherein the method further comprises:
- determining, using the differential detection engine, the one or more differential features in the second version of the application, wherein determining further comprises comparing the second state instance map with the first state instance map.

17. The method of claim 16, wherein the method further comprises:
- comparing the second state instance map with the first state instance map, wherein comparing further comprises comparing the one or more screenshots of the one or more user interfaces of the second version of the application with the one or more screenshots of the one or more user interfaces of the first version of the application at each of the one or more states.

18. The method of claim 13, wherein the method further comprises:
- determining, using the differential detection engine, one or more past differential features in one or more previous versions of the application;
- electronically receiving, from a computing device of a user, the one or more classes;
- initiating a machine learning algorithm on the one or more past differential features and the one or more classes; and
- training, using the machine learning algorithm, the machine learning model to classify one or more unseen differential features into the one or more classes.

* * * * *